US006353503B1

(12) United States Patent
Spitzer et al.

(10) Patent No.: US 6,353,503 B1
(45) Date of Patent: Mar. 5, 2002

(54) EYEGLASS DISPLAY LENS SYSTEM EMPLOYING OFF-AXIS OPTICAL DESIGN

(75) Inventors: Mark B. Spitzer, Sharon; John O. Crawford, Hopkinton, both of MA (US)

(73) Assignee: The Micropitical Corporation, Westwood, MA (US)

( * ) Notice: Subject to any disclaimer, the term of this patent is extended or adjusted under 35 U.S.C. 154(b) by 0 days.

(21) Appl. No.: 09/597,922

(22) Filed: Jun. 19, 2000

Related U.S. Application Data (60) Provisional application No. 60/140,329, filed on Jun. 21, 1999.

(51) Int. Cl.[7] .............................................. G02B 27/14
(52) U.S. Cl. ..................................................... 359/630
(58) Field of Search ................................. 359/630, 631, 359/633; 345/7, 8, 9

(56) References Cited

U.S. PATENT DOCUMENTS

| D195,365 S  | 6/1963  | Holt ............................ D57/1 |
| 3,192,826 A | 7/1965  | Papke ......................... 88/1.5 |
| 3,216,308 A | 11/1965 | Northcutt ........................ 88/1 |

(List continued on next page.)

FOREIGN PATENT DOCUMENTS

| DE | 22 05 325 C2 | 4/1973  | ................. 356/251 |
| DE | 36 23 206 A1 | 1/1988  | |
| GB | 301672       | 12/1928 | ................. 350/286 |

OTHER PUBLICATIONS

Ferrin, Frank J., "An update on optical systems for military head mounted displays", presented at SPIE's "AeroSense", Apr. 5–9, 1999, 8 pages.

Rotier, Donald J., "Optical Approaches to the Helmut Mounted Display", SPIE vol. 1116 Helmet–Displays (1989), pp.14–18.

Ditlea, Steve, "Inside Big Blue", *Popular Mechnics,* Dec. 98, pp. 54–59.

"Mission Impossible: Video Glasses and Sunglasses, The Absolute Ultimate In Covert Video Surveillance", www.pi-mall.com/nais/e.vsunglass.html, Oct. 27, 1998, pp. 1–4.

Video I/O interface for wearable computers, M.B. Spitzer et al., Proceedings of SPIE Conference 3689, Helmet and Head–Mounted Displays IV, Orlando, Florida, Apr. 5 and 6, 1999.

Real–Time American Sign Language Recognition: Using Desk and Wearable Computer Based Video, Thad Starner et al., Perpetual Computing TR#466, MIT Media Lab., to appear IEEE PAMI '98, submitted Apr. 26, 1996.

(List continued on next page.)

*Primary Examiner*—Ricky Mack
(74) *Attorney, Agent, or Firm*—Weingarten, Schurgin, Gagnebin & Lebovici LLP (57) ABSTRACT

An off-axis optical display system is provided. The system comprises an eyeglass lens assembly having a first lens section having a first surface, at least a portion of the first surface having a first curvature, and a second lens section having a second surface, at least a portion of the second surface having a second curvature. An interface is located between the first surface and the second surface. The interface comprises an optical layer and conforms to the first curvature of the first surface and the second curvature of the second surface. An image source is located off-axis with respect to the interface to transmit light along an optical path that reflects off the optical reflective surface of the interface toward an eye of a user. A portion of the optical path may be through air, and refraction is provided at the interface between air and the first lens. An aberration correction element is also provided.

51 Claims, 9 Drawing Sheets

U.S. PATENT DOCUMENTS

| | | | | |
|---|---|---|---|---|
| 3,229,580 | A | 1/1966 | Mitchell | 88/86 |
| 3,524,710 | A | 8/1970 | Rickert | 356/251 |
| 3,610,825 | A | 10/1971 | Fritzel | 178/7.8 |
| 3,787,109 | A | 1/1974 | Vizenor | 350/302 |
| 3,885,095 | A | 5/1975 | Wolfson et al. | 178/7.88 |
| 3,915,548 | A | 10/1975 | Opittek et al. | 350/3.5 |
| 3,923,370 | A | 12/1975 | Mostrom | 350/55 |
| 3,936,605 | A | 2/1976 | Upton | 179/1 SP |
| 3,940,204 | A | 2/1976 | Withrington | 350/3.5 |
| RE28,847 | E | 6/1976 | Vizenor | 350/302 |
| 4,052,073 | A | 10/1977 | Miller | 273/148 R |
| 4,082,432 | A | 4/1978 | Kirschner | 350/174 |
| 4,195,915 | A | 4/1980 | Lichty et al. | 350/345 |
| 4,218,111 | A | 8/1980 | Withrington | 350/3.72 |
| 4,447,128 | A | 5/1984 | Ferrer | 350/174 |
| 4,550,984 | A | 11/1985 | Reymond | 350/404 |
| 4,649,434 | A | 3/1987 | Weinblatt | 358/250 |
| 4,664,475 | A | 5/1987 | Ferrer | 350/174 |
| 4,665,385 | A | 5/1987 | Henderson | 340/539 |
| 4,704,000 | A * | 11/1987 | Pekar et al. | 359/482 |
| 4,722,601 | A | 2/1988 | McFarlane | 356/152 |
| 4,751,691 | A | 6/1988 | Kubick | 368/10 |
| 4,753,514 | A | 6/1988 | Kubik | 350/174 |
| 4,799,765 | A | 1/1989 | Ferrer | 350/174 |
| 4,806,001 | A | 2/1989 | Okabe et al. | 350/432 |
| 4,806,011 | A | 2/1989 | Bettinger | 351/158 |
| 4,818,048 | A | 4/1989 | Moss | 350/3.7 |
| 4,826,287 | A | 5/1989 | Cook et al. | 350/174 |
| 4,852,988 | A | 8/1989 | Velez et al. | 351/210 |
| 4,853,306 | A | 8/1989 | Wreede et al. | 430/1 |
| 4,867,551 | A | 9/1989 | Perera | 351/158 |
| 4,869,575 | A | 9/1989 | Perera | 350/174 |
| 4,884,137 | A | 11/1989 | Hanson et al. | 358/108 |
| 4,902,083 | A | 2/1990 | Wells | 350/6.6 |
| 4,934,773 | A | 6/1990 | Becker | 350/6.6 |
| 4,961,626 | A | 10/1990 | Fournier et al. | 359/630 |
| 4,968,117 | A | 11/1990 | Chern et al. | 350/162.24 |
| 4,973,132 | A | 11/1990 | McDonald et al. | 350/174 |
| 4,973,139 | A | 11/1990 | Weinhrauch et al. | 350/345 |
| 4,988,183 | A | 1/1991 | Kasahara et al. | 351/210 |
| 5,003,300 | A | 3/1991 | Wells | 340/705 |
| 5,013,134 | A | 5/1991 | Smith | 350/174 |
| 5,028,119 | A | 7/1991 | Hegg et al. | 350/174 |
| 5,044,709 | A | 9/1991 | Smith et al. | 359/13 |
| 5,050,962 | A | 9/1991 | Monnier et al. | 359/13 |
| 5,053,755 | A | 10/1991 | Smith et al. | 340/705 |
| 5,129,716 | A | 7/1992 | Holakovszky et al. | 351/50 |
| 5,138,470 | A | 8/1992 | Moss et al. | 359/13 |
| 5,162,828 | A | 11/1992 | Furness et al. | 353/122 |
| 5,184,250 | A | 2/1993 | Lacroix | 359/631 |
| 5,212,471 | A | 5/1993 | McDonald | 340/705 |
| 5,214,425 | A | 5/1993 | Wreede | 340/980 |
| 5,231,379 | A | 7/1993 | Wood et al. | 340/705 |
| 5,281,957 | A | 1/1994 | Schoolman | 345/8 |
| 5,281,960 | A | 1/1994 | Dwyer, III | 345/31 |
| 5,309,169 | A | 5/1994 | Lippert | 345/8 |
| 5,320,538 | A | 6/1994 | Baum | 434/307 |
| 5,325,386 | A | 6/1994 | Jewell et al. | 372/50 |
| 5,334,991 | A | 8/1994 | Wells et al. | 345/8 |
| 5,348,477 | A | 9/1994 | Welch et al. | 434/43 |
| 5,359,669 | A | 10/1994 | Shanley et al. | 382/6 |
| 5,367,345 | A | 11/1994 | DaSilva | 351/123 |
| 5,369,415 | A | 11/1994 | Richard et al. | 345/6 |
| 5,381,267 | A | 1/1995 | Woody | 359/632 |
| 5,384,654 | A | 1/1995 | Iba | 359/364 |
| 5,392,158 | A | 2/1995 | Tosaki | 359/633 |
| 5,416,876 | A | 5/1995 | Ansley et al. | 385/116 |
| 5,446,507 | A | 8/1995 | Chang | 351/158 |
| 5,455,591 | A | 10/1995 | Hui | 342/185 |
| 5,459,612 | A | 10/1995 | Ingleton | 359/630 |
| 5,469,185 | A | 11/1995 | Lebby et al. | 345/8 |
| 5,491,510 | A | 2/1996 | Gove | 348/77 |
| 5,506,728 | A | 4/1996 | Edwards et al. | 359/629 |
| 5,519,410 | A | 5/1996 | Smalanskas et al. | 345/7 |
| 5,537,253 | A | 7/1996 | Cox et al. | 359/630 |
| 5,539,578 | A | 7/1996 | Togino et al. | 359/630 |
| 5,576,887 | A | 11/1996 | Ferrin et al. | 359/631 |
| 5,579,148 | A | 11/1996 | Nishikawa et al. | 359/214 |
| 5,583,590 | A | 12/1996 | Clupper | 351/200 |
| 5,585,871 | A | 12/1996 | Linden | 351/158 |
| 5,589,846 | A | 12/1996 | Kobayashi | 345/8 |
| 5,596,451 | A | 1/1997 | Handschy et al. | 359/633 |
| 5,606,743 | A | 2/1997 | Vogt et al. | 455/347 |
| 5,610,765 | A | 3/1997 | Colucci | 359/633 |
| 5,626,410 | A | 5/1997 | Chambers et al. | 353/94 |
| 5,629,790 | A | 5/1997 | Neukermans et al. | 359/198 |
| 5,648,789 | A | 7/1997 | Beadles et al. | 345/8 |
| 5,653,751 | A | 8/1997 | Samiy et al. | 623/4 |
| 5,654,827 | A | 8/1997 | Reichert | 359/631 |
| 5,654,828 | A | 8/1997 | Togino et al. | 359/633 |
| 5,671,037 | A | 9/1997 | Ogasawara et al. | 351/158 |
| 5,673,139 | A | 9/1997 | Johnson | 359/291 |
| 5,682,173 | A | 10/1997 | Holakovszky et al. | 345/8 |
| 5,699,194 | A | 12/1997 | Takahashi | 359/633 |
| 5,712,649 | A | 1/1998 | Tosaki | 345/8 |
| 5,717,479 | A | 2/1998 | Richards | 351/158 |
| 5,719,588 | A | 2/1998 | Johnson | 345/8 |
| 5,744,788 | A | 4/1998 | Metlitsky et al. | 235/454 |
| 5,751,493 | A | 5/1998 | Hur | 359/630 |
| 5,808,589 | A | 9/1998 | Fergason | 345/8 |
| 5,815,326 | A | 9/1998 | Takahashi | 359/729 |
| 5,886,822 | A | 3/1999 | Spitzer | 359/630 |
| 5,943,171 | A | 8/1999 | Budd et al. | 359/631 |
| 5,973,845 | A | 10/1999 | Hildebrand et al. | 359/630 |
| 5,991,103 | A | 11/1999 | Togino | 359/834 |
| 6,005,720 | A | 12/1999 | Watters et al. | 359/633 |
| 6,023,372 | A | 2/2000 | Spitzer et al. | 359/630 |
| 6,081,304 | A * | 6/2000 | Kuriyama et al. | 348/838 |
| 6,091,546 | A | 7/2000 | Spitzer | 359/618 |

OTHER PUBLICATIONS

WearCam' (The Wearable Camera): Personal Imaging Systems for long–term use in wearable tetherless computer–mediated reality and personal Photo/Videographic Memory Prosthesis, Steve Mann, Digest of Papers of the Second International Symposium on Wearable Computers, Oct. 19–20, 1998, Pittsburgh, PA, pp. 124–131, sponsored by IEEE Computer Society Task Force on Wearable Information Systems.

* cited by examiner

EYEGLASS DISPLAY LENS SYSTEM EMPLOYING OFF-AXIS OPTICAL DESIGN

CROSS REFERENCE TO RELATED APPLICATIONS

This application claims priority under 35 U.S.C. § 119(e) of U.S. Provisional Application No. 60/140,329, filed Jun. 21, 1999, the disclosure of which is incorporated by reference herein.

STATEMENT REGARDING FEDERALLY SPONSORED RESEARCH OR DEVELOPMENT

N/A

BACKGROUND OF THE INVENTION

Figure 1:
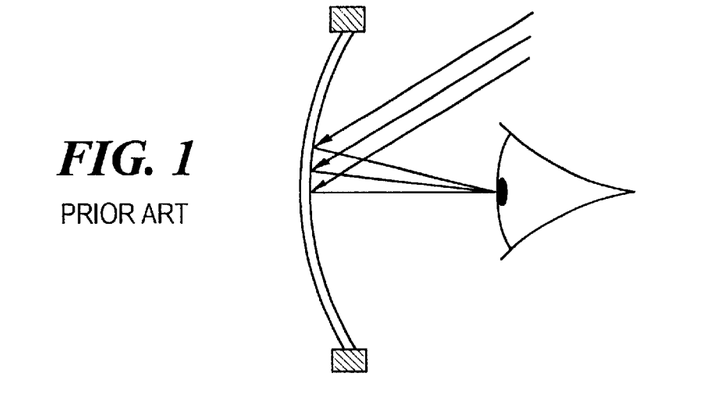
FIG. 1 is a schematic illustration of a prior art eyeglass lens in which light is reflected from miniature mirrors on the inside surface of the lens.

The reduction of head-mounted display optics to a scale commensurate with incorporation within eyeglasses has been addressed by several inventors. One method involves free-space image projection from the temple toward the eyeglass lens, the rays then being reflected from the inside surface of the eyeglass lens toward the eye. For example, Upton (U.S. Pat. No. 3,936,605) describes an eyeglass display in which the rays are reflected from miniature mirrors placed on the inside surface of the eyeglass lens (FIG. 1). Bettinger (U.S. Pat. No. 4,806,011) discloses an improvement on the Upton invention in which the inside or outside surface of the eyeglass lens itself, having a curvature intended to correct the user's vision, is used for focusing the light from the image and for reflecting the light to the eye. Spitzer discloses an eyeglass display system in which the light is supplied by an optical fiber to a micromechanical image source appended to or placed within a temple or other fixture, and which is then reflected from the surface of the eyeglass lens (U.S. Pat. No. 5,715,337).

Figure 2:
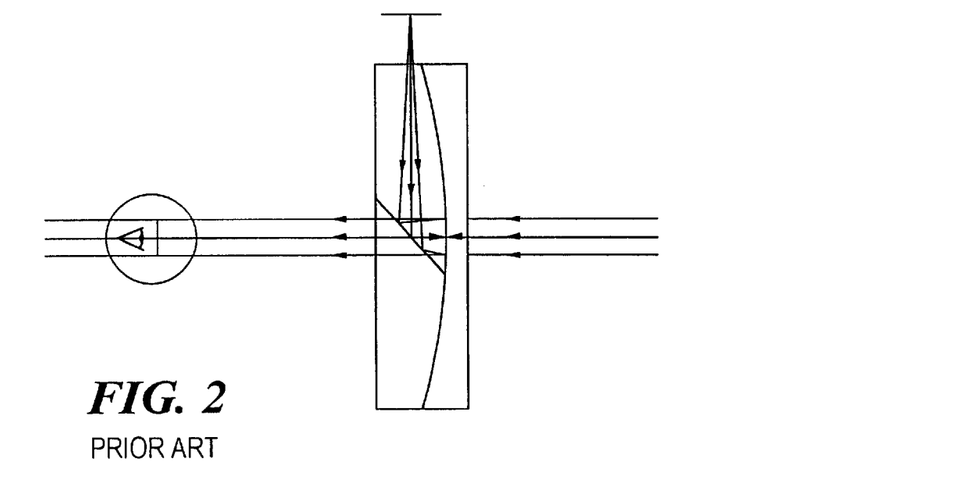
FIG. 2 is a schematic illustration of a prior art eyeglass lens in which light is propagated to a surface within the lens, reflected and magnified, and directed to the eye.
Figure 3:
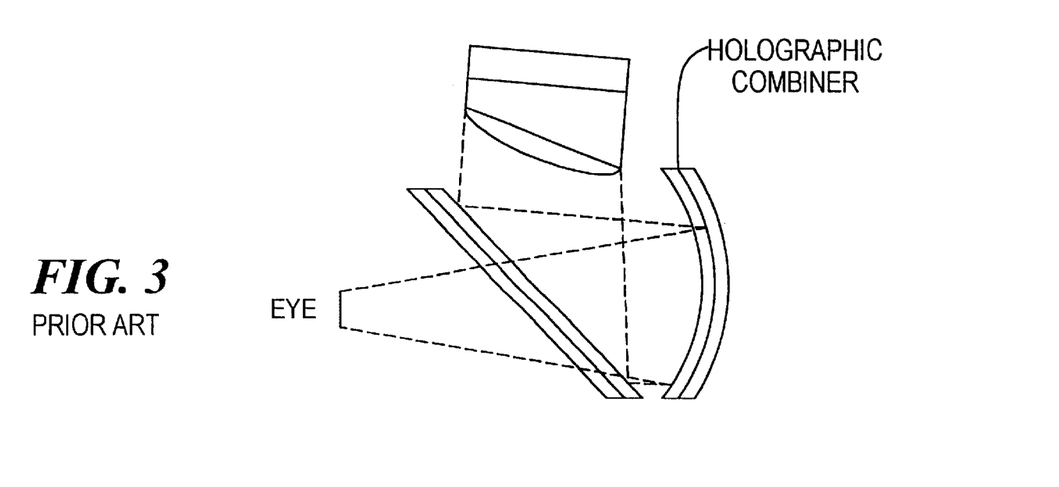
FIG. 3 is a schematic illustration of a prior art head-mounted display combiner in which light is reflected from a holographic optical element inside the combiner.

A number of patents have also described how embedded optical surfaces can be used in display viewing systems. Reichert (U.S. Pat. No. 5,654,827) discloses an optical system for a head-mounted display in which light is propagated to a surface within the lens, reflected and magnified and then directed to the eye of the user (FIG. 2). In another invention by Spitzer, light from the display is relayed through the body of the eyeglass lens and then passes from an interior partially reflecting surface within the lens to the eye (U.S. Pat. No. 5,886,822, the disclosure of which is incorporated by reference herein).

In prior art inventions of Bettinger, Reichert and Spitzer, the inventors make use of on-axis or nearly on-axis optical systems. An on-axis optical system means an optical design in which light is incident on optical surfaces having rotational symmetry about the optical axis. A nearly on-axis optical system means a system that is close enough to axial so as to not require correction of aberrations induced by the off-axis geometry. In an off-axis design, the resulting aberrations are visible to the average viewer unless some form of aberration correction is also employed.

The concepts of on-axis (or axial) and off-axis (or non-axial) systems are simple to define for reflective curved surfaces, because these surfaces have a center of curvature and a vertex and in general have rotational symmetry about a line connecting the center of curvature and vertex. A system is axial if a ray from the center of the object (or display) passes through the center of curvature of the reflective surface and also passes through the center of the pupil of the eye. The distinction between axial and non-axial systems is more fully described by G. H. Smith in "Practical Computer-Aided Lens Design" (Willmann-Bell).

The importance of off-axis systems relates to the fitting of an optical system within eyewear close to the head. Off-axis designs have the ability to form an optical path that more closely conforms to the shape of the head, and hence have the potential to produce a more compact system than axial systems.

A principal limitation of approaches that use the external surfaces of the lens for image magnification and reflection, such as the approaches of Bettinger and Upton, arises from the primary need in an ophthalmic device such as eyeglasses to use the external surfaces of the lens for vision correction. In general, the external surfaces cannot be shaped to provide simultaneous vision correction, magnification for display viewing and aberration correction.

Prior art inventions have considered off-axis optical systems. For example, the invention of Upton involves use of off-axis reflectors, and Bettinger (U.S. Pat. No. 4,806,011) uses an optical design that may be either nearly on-axis, or off-axis, depending on the position of a relay mirror. Spitzer (U.S. Pat. No. 5,715,337 and U.S. Pat. No. 5,886,822) may be axial or non-axial depending on the internal configuration of the surfaces. Except for Spitzer, these prior art off-axis systems employ reflection from exterior surfaces of the eyeglass lens. In the Upton invention, the eyeglass lens is provided with an exterior array of tiny mirrors and in the Bettinger invention the lens surface is coated with a partially reflective mirror coating.

Rallison (U.S. Pat. No. 5,303,085) has described a method of using a holographic combiner mounted between two thin curved surfaces to form an off-axis combiner for a head-mounted display. This technique does not use reflection from the lens surface, nor does it use refraction from the lens surface. Owing to the off-axis nature, a fiber optic faceplate is necessary to correct aberrations.

SUMMARY OF THE INVENTION

The invention described herein comprises an optical system for viewing a display which is an improvement over the prior art, owing to the integration of the off-axis free-space projection of an image to the surface of a lens, refraction by the surface of the lens, propagation of the rays to the interior of the eyeglass lens, and then reflection and magnification of the image from an interior eyeglass lens surface, followed by reflection to the surface, a further refraction at the surface, and propagation of the light to the eye. Generally, on-axis or nearly on-axis optical approaches yield the lowest aberration. However, aberrations resulting from off-axis designs can in many cases be corrected in various ways to be described, and with such correction, an off-axis design can lead to a display viewing system of reduced weight and complexity. However, the use of interior optical surfaces need not affect the user's vision and, therefore, can be used for magnification and aberration control.

The present invention is an improvement of the prior art because optical elements that are provided inside the eyeglass lens are coupled to exterior optics by a significant degree of refraction at the surface of the eyeglass lens. The improvement over Reichert's head-mounted display viewing optics (U.S. Pat. No. 5,654,827) and Spitzer's eyeglass display optics (U.S. Pat. No. 5,886,822) is the use of an off-axis optical design, coupled with refraction from the surface of a lens having high refractive index, and combined with surfaces internal to the lenses. This invention leads to a substantial reduction in the degree of deviation from axial optics, and a commensurate reduction in aberrations.

DESCRIPTION OF THE DRAWINGS

The invention will be more fully understood from the following detailed description taken in conjunction with the accompanying drawings in which.

DETAILED DESCRIPTION OF THE INVENTION

Figure 4:
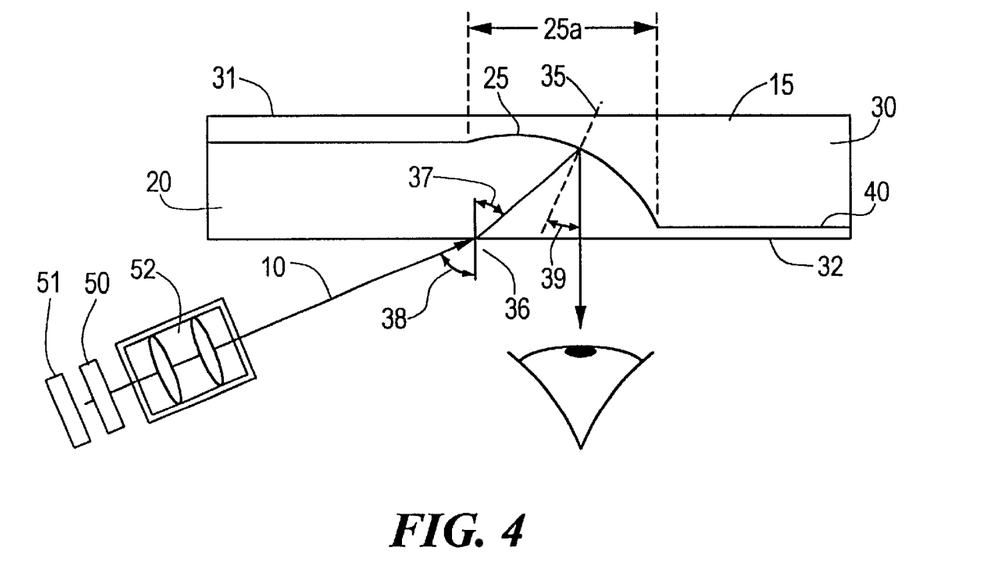
FIG. 4 is a schematic illustration of an eyeglass lens according to the present invention.

FIG. 4 shows an eyeglass lens 15 in accordance with this invention. The eyeglass lens may be formed from two sections, an inside section 20 bonded to an outside section 30 to form an ophthalmic lens. The two sections 20, 30, which may be made from the same material so that the two sections may have the same refractive properties, are joined at an interface 40. The interface curvature is in general unimportant, except for mirror 25, extending over distance 25a, which is shaped to provide optical power. As will be described below, the interface may be provided with an optical coating to reflect rays 10, which are provided by an image source 50, to the eye. If the image source 50 is a liquid crystal display, it is provided with a back illuminator 51. Note that the two sections 20, 30 need not have the same index of refraction or Abbe number. In certain designs intended to reduce chromatic aberration in the main eyeglass lens 15, different materials may be chosen to this end.

The curvature of the mirror 25 at interface 40 between sections 20 and 30 may be spherical, toric, parabolic, aspherical, flat or another complex shape, depending on the degree of magnification and aberration correction desired and the location of mirror 25. The principal purpose of the mirror 25 is to reflect rays 10 and magnify the image provided by the image source 50, so that the image may be conveniently viewed. Mirror 25 may be tilted with respect to the normal 36 to the main lens 15 surface 32 to provide ray 10 to the eye, with minimal refraction as the ray passes from the lens 15 to air. The angle of refraction 37 is determined by Snell's Law. Accordingly, a high index of refraction of the optical material comprising section 20 combined with a large angle of incidence 38, results in a smaller angle 37, and an angle of reflection 39 that is near to axial. In this way, the overall system may appear to be largely non-axial, but in fact owing to refraction at the lens surface 32, the angle of incidence at mirror 25 may be reduced. Materials for section 20 and 30 may be any of the known commercial ophthalmic materials used in the art, which have index of refraction of up to 1.9. Yet higher index of refraction is useful and obtainable from many optical grade materials that are not presently used in ophthalmic devices.

Referring to FIG. 4, line 36 marks a normal to the surface 32 of lens 15, and line 35 marks a normal to the tangent of the curved surface of mirror 25. As an example, consider a material from which lens 15 is formed that has an index of refraction of 1.8. In this case, if the angle of incidence 38 is 60°, then angle of refraction 37 is 28.8°. Accordingly, angle 39 is 14.4°, and ray 10 exits lens 15 through surface 32 in the surface normal direction, meaning that the user perceives a virtual image directly in front of the eye, and that refraction at surface 32 is easily accommodated.

The mirror 25, when integrated with the eyeglass lens, may be seen to be, for example, a form of Mangin mirror that provides additional tolerance for non-axial geometries, by refracting the rays to a more nearly axial geometry. This is an improvement over all other prior art non-axial approaches.

Figure 5:
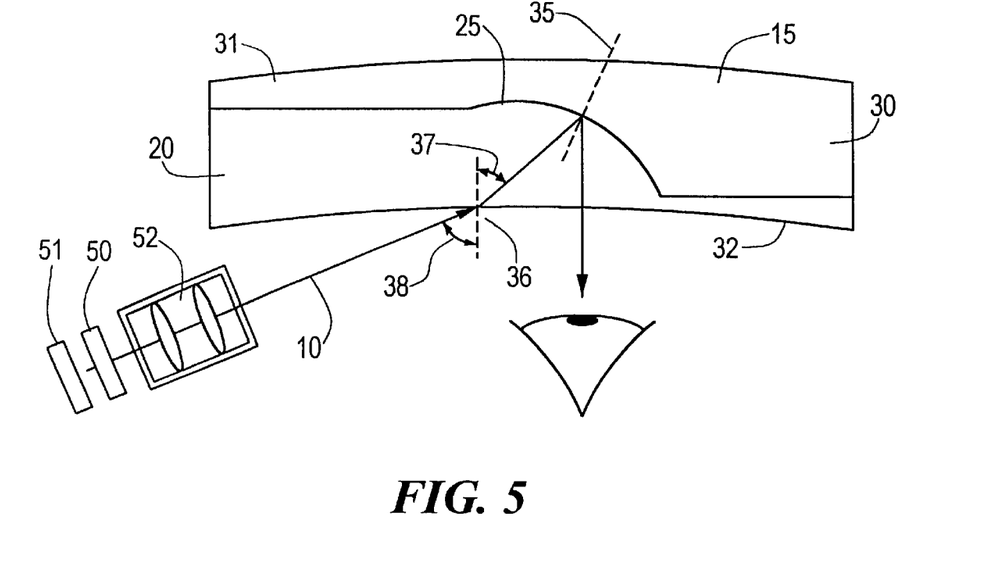
FIG. 5 is a schematic illustration of an eyeglass lens according to the present invention incorporating vision correction.

The eyeglass lens 15 may have curvature on the external surfaces 31, 32 to provide prescriptive vision correction, as shown in FIG. 5. In such a case, the various lens elements must be modified to correct for propagation of the rays 10 through the curved surface 32.

Figure 6:
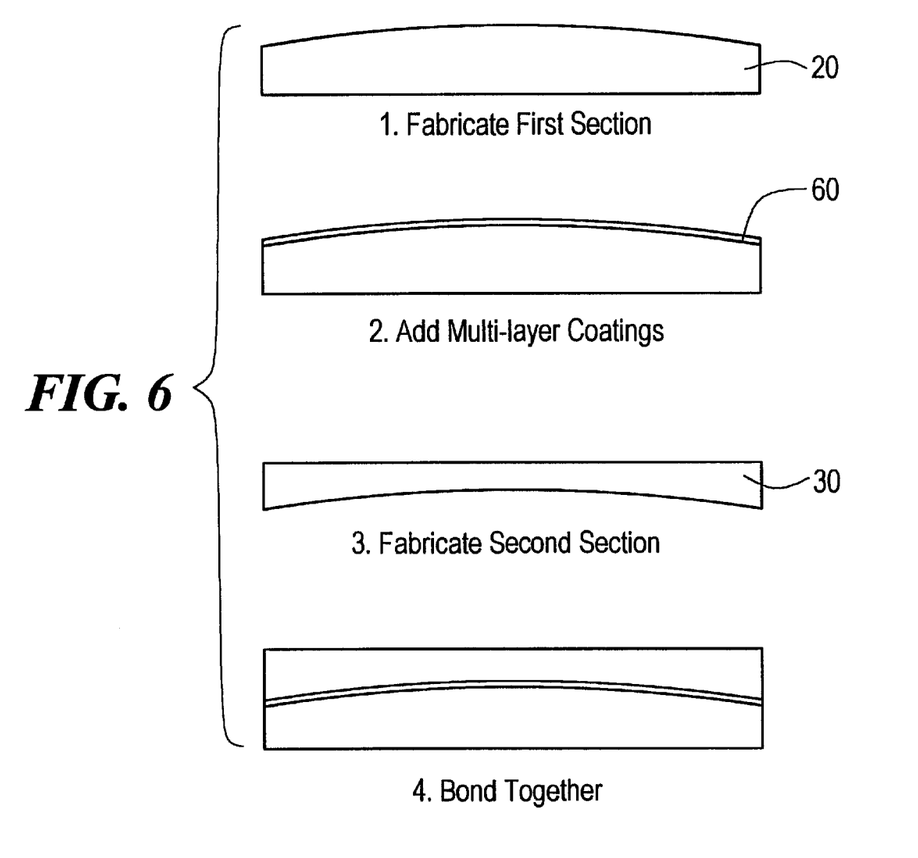
FIG. 6 schematically illustrates a method of forming an eyeglass lens according to the present invention.

FIG. 6 shows how the lens may be assembled. First, sections 20 and 30 are formed by any number of techniques known in the art, including injection molding, casting, or grinding and polishing. For purposes of illustration, FIG. 6 shows a simple interface comprising a spherical surface; however it should be understood that in general the interface would have a more complex shape. The surface of one of the sections is then coated with multi-layer thin films 60 designed to reflect the desired polarization or wavelength. For example, if the image source is illuminated by narrow bands of red, green, and blue light, then the films are designed to reflect these particular wavelength bands and pass others. Alternatively, if the image source emits linearly polarized light, as is the case for many active matrix liquid crystal displays, then the multi-layers are selected to reflect one linear polarization and to pass the orthogonal linear polarization. Both polarization-selecting and wavelength-selecting coatings are well known in the optics art. (See, for example, W. J. Smith, "Modern Optical Engineering," McGraw-Hill, p. 192.) A third alternative is to use a thin metal coating that passes approximately one-half the light and reflects approximately one-half the light, as may be formed, for example, by a layer of aluminum, chromium, or silver with thickness on the order of several hundred angstroms, the exact thickness being specific to the material used. Any of these coatings can be designed and optimized using commercial optical software such as the Zeemax Optical Design Program sold commercially by Focus Software, or Code V sold commercially by Optical Research Associates.

The interior curvatures of the sections 20 and 30, and more particularly mirror 25, determine the optical power applied to the rays from the image source. For example, for a spherical surface intended for mounting in eyeglasses, a typical distance between the mirror at interface 60 and the image source is 35 mm. In such a case, if the radius of curvature of the surfaces of sections 20 and 30 is 70 mm, the virtual image is placed at infinity. Adjustment of the position of the image source results in adjustment of the position of the virtual image to provide focusing.

An alternative embodiment comprises the use of a diffractive or holographic layer at the interface 40 instead of or in addition to multi-layer coatings, as described by Rallison in U.S Pat. No. 5,303,085. In such a case, the holographic or diffractive layer is first formed separately by practices well known in the art, and is then placed between two curved, tilted, or flat elements 20, 30, the curvature or tilt depending on the desired optical design.

Figure 7:
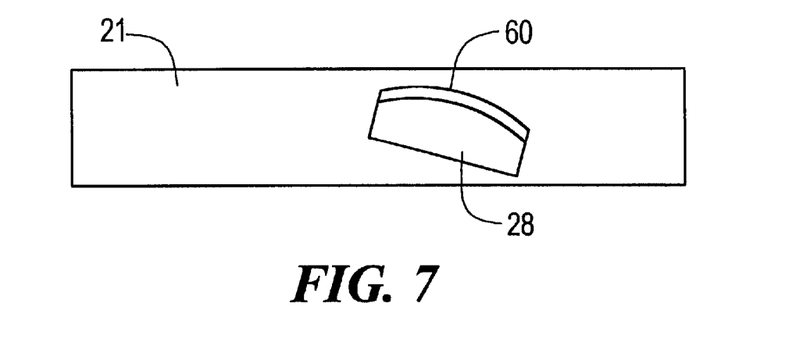
FIG. 7 schematically illustrates an alternative method of forming an eyeglass lens according to the present invention.

An alternative method of fabricating the lens comprises the use of molding or casting of the lens with an inserted optical element. FIG. 7 shows the resulting lens structure. A lens 21 is formed by casting, injection molding, or other similar techniques. The lens includes an optical element 28 made of the same material as lens 21.

Prior to the molding of lens 21, the optical element is coated with the optical layer 60 which serves to reflect or diffract the incident light, as previously described. The coated optical element is embedded in lens 21 as part of the molding or casting process, resulting in a lens that is functionally equivalent to the other embodiments described herein.

Figure 8:
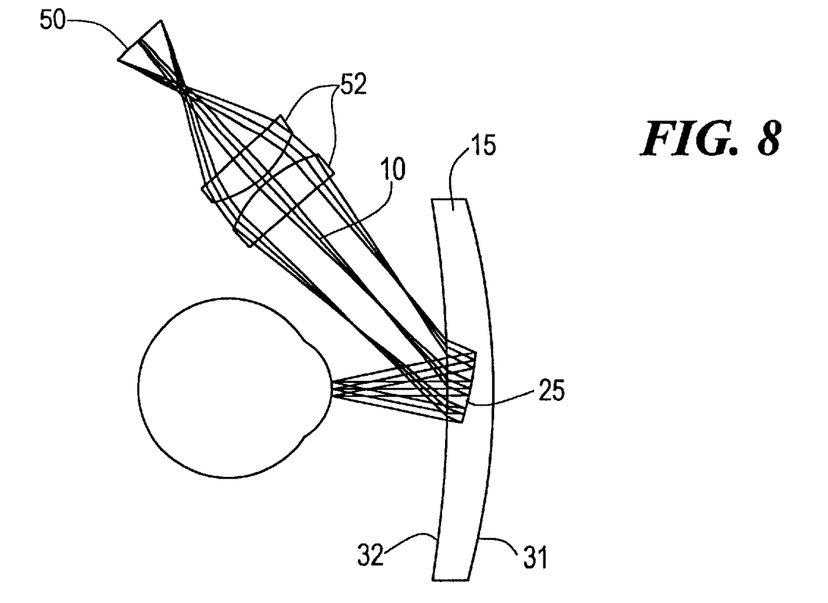
FIG. 8 is a schematic illustration of a further embodiment of an eyeglass lens and display system showing a ray trace according to the present invention.

Using reference numerals as in FIGS. 4 and 5, FIG. 8 depicts a specific optical implementation of a preferred embodiment. In this implementation, an image source 50, which may be tilted with respect to the optical axis of a relay optic 52, creates rays 10 that are refracted by the preferably curved surface 32 of main lens 15, and reflected by the preferably curved surface of mirror 25, to relay rays 10 to the eye of the observer, creating an image of the source 50 at a convenient viewing distance. As described in FIG. 5, main lens surfaces 31 and 32 may be employed to provide ophthalmic vision correction for the user. This embodiment may be described in terms of an optical prescription as follows:

| Type, Description | FIG. 8. Ref No. | Comment | Radius (mm) | Thickness (following) (mm) | Glass (mm) | Diameter (mm) |
|---|---|---|---|---|---|---|
| Display | 51 | Object Surface | Flat | 20 | Air | 10 |
| Relay Lens 1, Surf 1 | 52 | Lens | 263.4 | 4 | SFL6 | 15 |
| Relay Lens 1, Surf 2 | 52 | Inter-Lens Space | 14.7 | 1 | Air | 15 |
| Relay Lens 2 | 52 | Lens | 16.7 | 5 | BK7 | 15 |
| Relay Lens 1 | 52 | Air to Eyeglass | Flat | 20 | Air | 15 |
| Eyeglass | 32 | Base 6 | 167 | 3 | $n_d =$ | 52 |

-continued

| Type, Description | FIG. 8. Ref No. | Comment | Radius (mm) | Thickness (following) (mm) | Glass (mm) | Diameter (mm) |
|---|---|---|---|---|---|---|
| Lens, at 48° to relay lens axis | | Ophthalmic Eyeglass Lens | | | 1.8 | |
| Reflector at 12° to Eyeglass Lens axis | 25 | Tilted Mirror | 75 | 3 | Mirror | 10 |
| Eyeglass Lens | 32 | Back Through Ophthalmic | 167 | 15 (eye relief) | Air | 52 |
| Image | — | Dist to Image | Flat | 600 | Air | 130 |

One skilled in the art will recognize that this basic prescriptive embodiment may be improved without departing from the spirit of the basic layout. These improvements may be made in terms of resolution, field of view, brightness, off-axis positioning, and other factors by the selection of alternate optical elements, for example the use of aspheric, toric, holographic, or achromatic lens elements, in place of the ones described.

Figure 9:
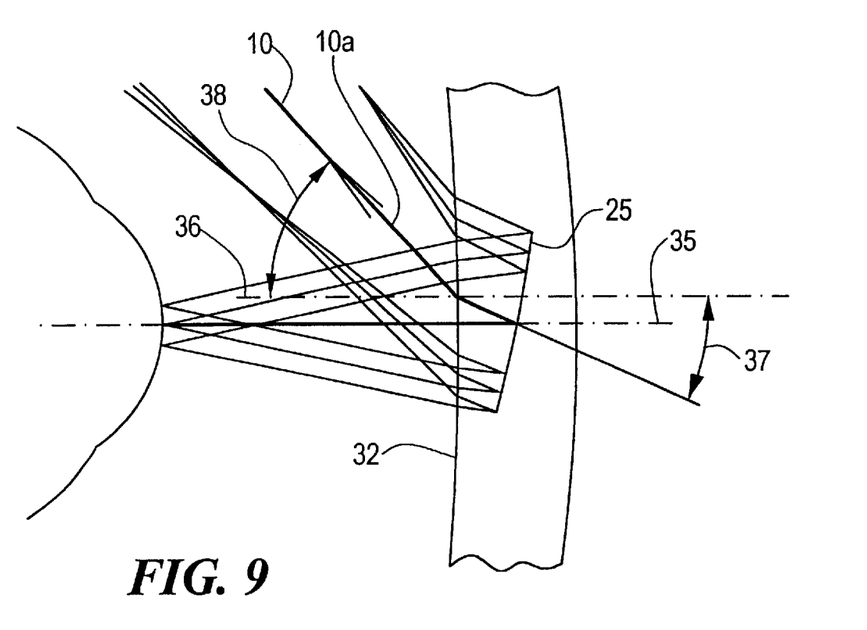
FIG. 9 is an enlarged schematic illustration of an eyeglass lens and display system in an eyeglass frame according to the present invention.

FIG. 9 is a close-up view detailing the central zone of FIG. 8, further depicting the manner in which rays 10 are refracted at main lens surface 32, and reflected to the user's eye by mirror 25. One of the rays 10, indicated as a central ray bundle 10a, intersects surface 32 coincident with a surface normal 36, forming an intersection angle 38 with the surface. Following Snell's law, this ray is refracted as it enters the material of the lens, traveling at an angle 37 to the surface normal. Note that in entering the lens material from the surrounding air, the ray traverses a transition from a low optical index material, air, with index n=1.0, to the higher index main lens material, for example with n=1.8. As this ray traverses the index change from low to high it is bent towards the normal. This central ray strikes the mirror 25 at normal 35 and is reflected through the center of the main lens to the center of the user's eye. By this combination of refraction and reflection, rays from the off-axis display source 50 are brought in line with the user's eye. One skilled in the art will appreciate that this combination results in a substantially symmetric ray bundle with reduction in the off-axis aberrations, such as astigmatism, field curvature, and coma.

Figure 10:
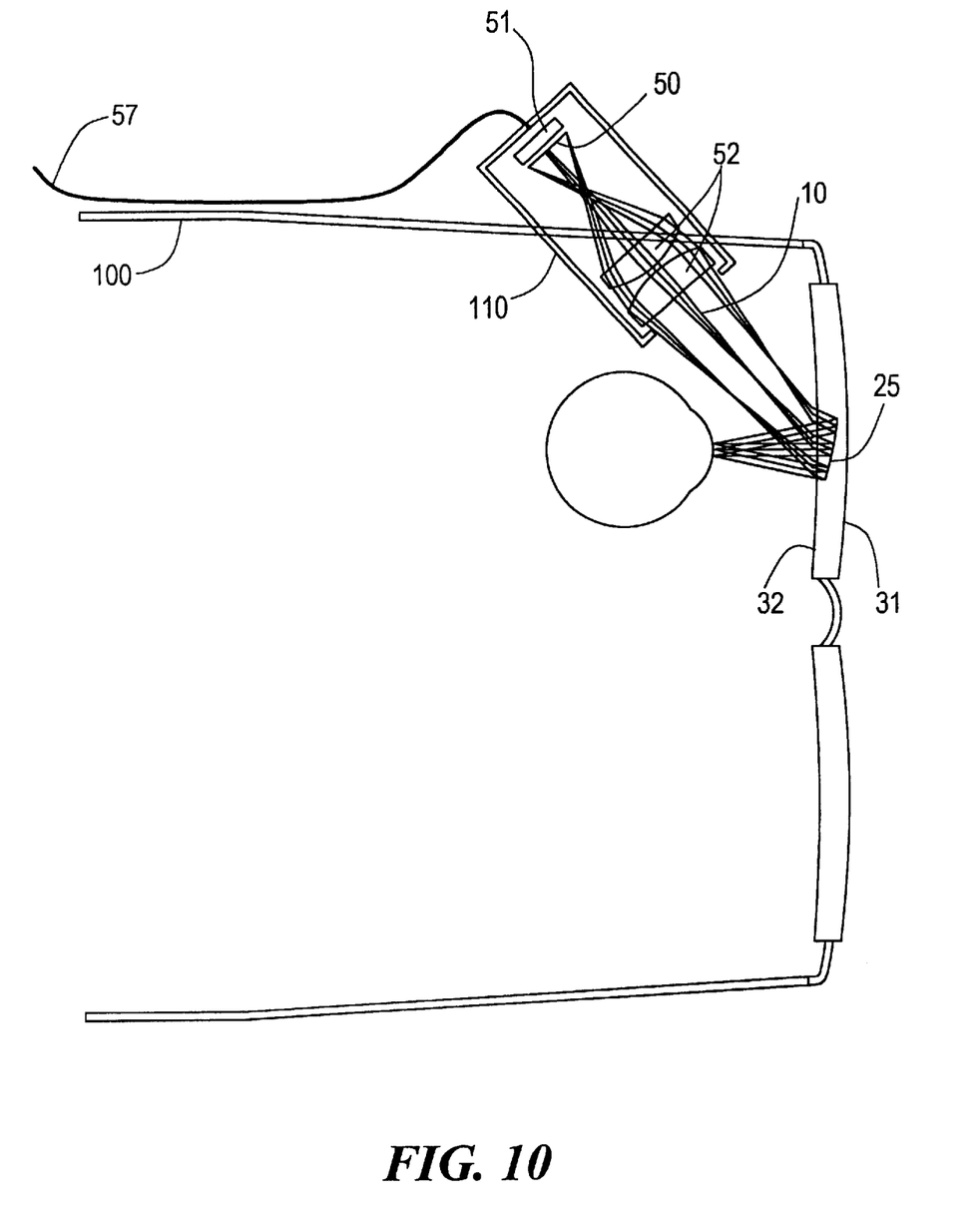
FIG. 10 is a schematic illustration of the display mounted in a spectacle frame according to the present invention.

FIG. 10 depicts the first preferred embodiment implemented in the form of an eyeglass. In this implementation, an image source and optics assembly pod 110, containing an illuminator 51, a display 50, and a relay lens set 52, is slidably and rotatably affixed to the temple piece 100 of an eyeglass frame. The rotation and sliding motion permit the user to aim the image source at an eyeglass lens 15, where the output ray bundle is refracted by the first eyeglass lens surface 32 to impinge on reflector 25 for relay to the eye of a user. Optionally, ophthalmic vision correction may be performed by surfaces 32 and 31.

Figures 11A, 11B:
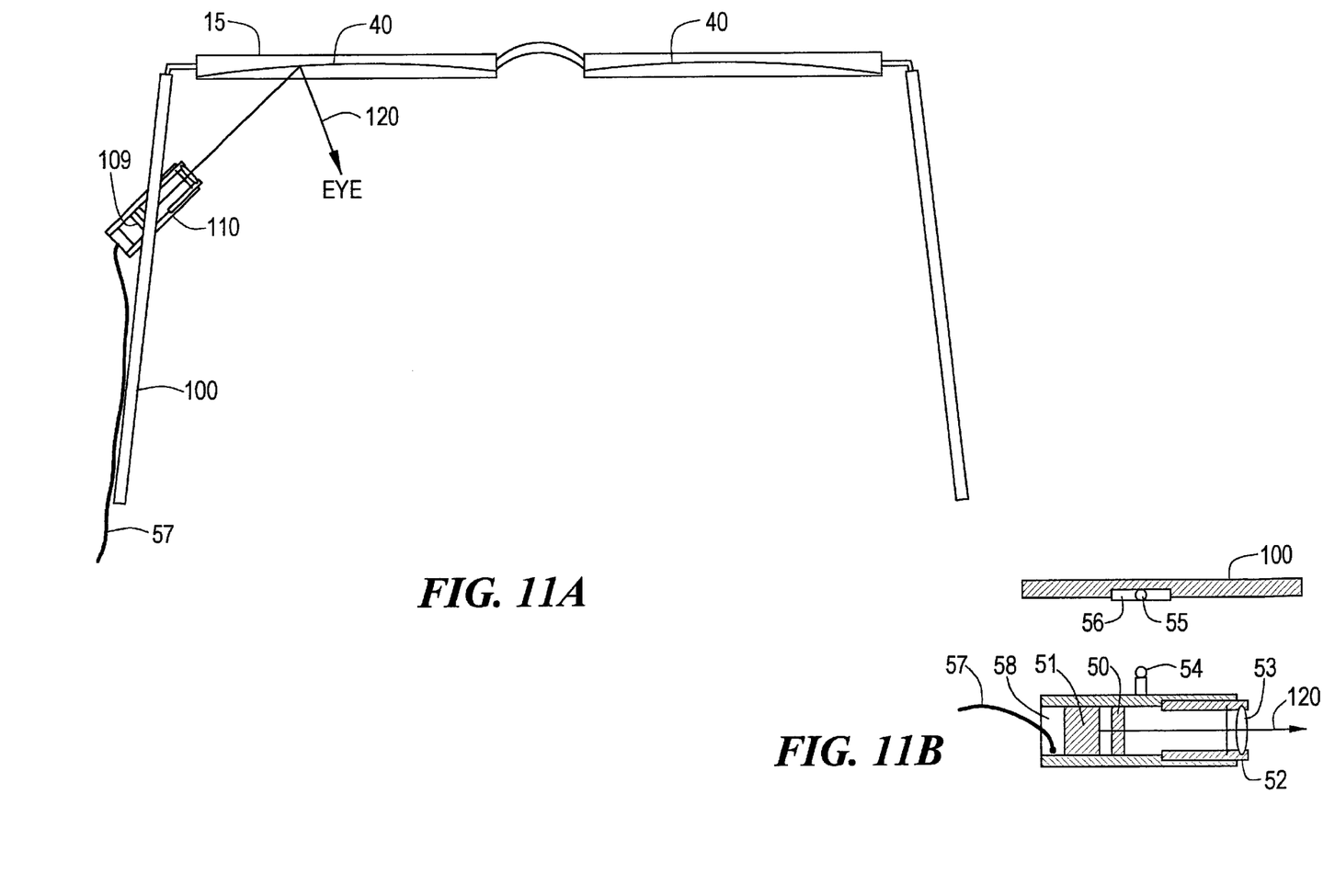
FIG. 11A is a schematic illustration of a further embodiment of an eyeglass lens according to the present invention.
FIG. 11B is a schematic illustration of the housing of FIG. 11A.

A second preferred embodiment of the optical system of this invention is shown in FIG. 11A, wherein an optical element 109 comprising, for example, a singlet, an aspheric element, a gradium index lens, a doublet or triplet, a binary or refractive element, a reflective optical device or other optical systems are used in combination with a reflective element 40 to relay an image from the display to the eye of a user. The resolution of this system is matched to the desired angular imaging properties of the device and to the resolution and size of the display 50.

The mounting of the eyeglass lens 15 described above in an eyeglass frame is also shown in FIG. 11A. An image source and optics assembly 110 are attached to a left temple 100. The attachment may be made by a sliding fixture 56 to which the optics assembly is mounted via a socket 55 intended to house ball 54, shown more fully in FIG. 11B. Sliding fixture 56 permits lateral translation of assembly 110, and the ball 54 and socket 55 permit angular rotation, so as to allow the user to position the image in a convenient field of view. Images are relayed to the left eye via rays 120. The image source assembly 110 contains an image source 50, such as an active matrix liquid crystal display, for example, the CyberDisplay manufactured by Kopin Corporation, and a backlight 51 for illumination. The image source 50 is mounted on a sliding base within assembly 110. Light rays 120 from the image source pass through lenses 53, which modify vergence, correct aberrations, and prepare the light rays for proper viewing upon reflection by interface 40. Lenses 53 may be mounted on a sliding tube 52 that provides a further adjustment in the optics. Interconnections to the display and backlight are made through cable 57 that is terminated within cavity 58. The image source may also be a flat panel active matrix electroluminescent display, a flat panel field emission display, a cathode ray tube, or an array of organic or inorganic light emitting diodes. The rays 120 from the image source are linearly polarized and reflect from an interface 40 within the left lens. The rays are focused by the curvature of the lens and incident on the pupil of the user's left eye. An analogous structure may be created for the right eye.

Figure 12:
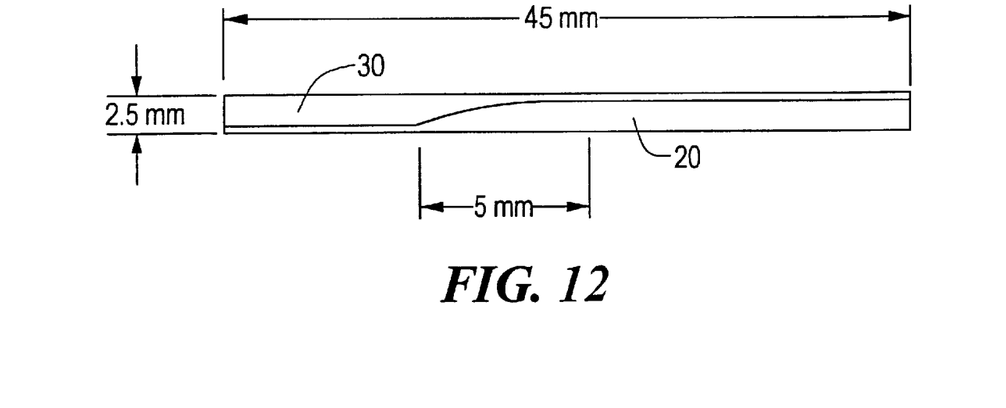
FIG. 12 is a schematic illustration of a still further embodiment of an eyeglass lens according to the present invention.

For various eyeglass applications, it is necessary to minimize the thickness of the eyeglass lens. This thickness minimization can be accomplished by limiting the extent of the reflecting surface in the lens. FIG. 12 illustrates incorporation of a partially reflecting aspheric mirror, which is limited in extent to 5 mm. The lens thickness is 2.5 mm.

Figure 13:
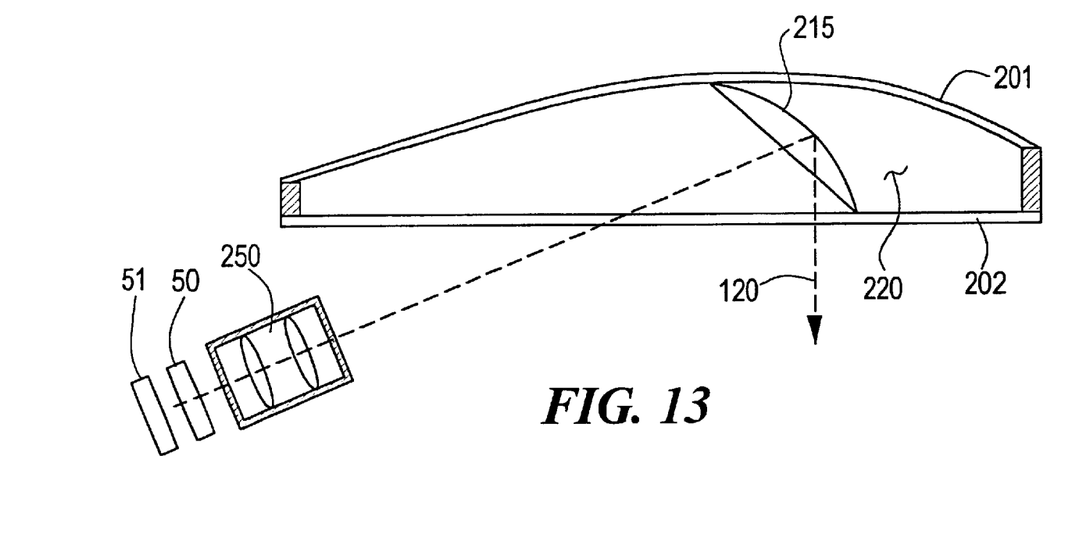
FIG. 13 is a schematic illustration of a still further embodiment of an eyeglass lens according to the present invention.

A third preferred embodiment of the optical system is shown in FIG. 13, and comprises the use of thin plastic or glass in molded sheet form for the two external surfaces 201, 202. The two plastic or glass sheets may or may not be of the same shape. For example, the inside sheet 202 may be flat while the outside sheet 201 may be aspherical. Owing to their very thin nature, these sheets add no meaningful degree of optical power to the view through the eyeglass lens. The sheets are attached with edge members 218 to form a space 220 between the two sheets.

An illuminator 51 and display 50 are placed in the optical path of lens system 250, which projects light towards mirror 215, which may be, for example, a Mangin mirror. The mirror is placed within the lens to focus light and reflect the image toward the eye, as shown by ray 120.

Figure 14:
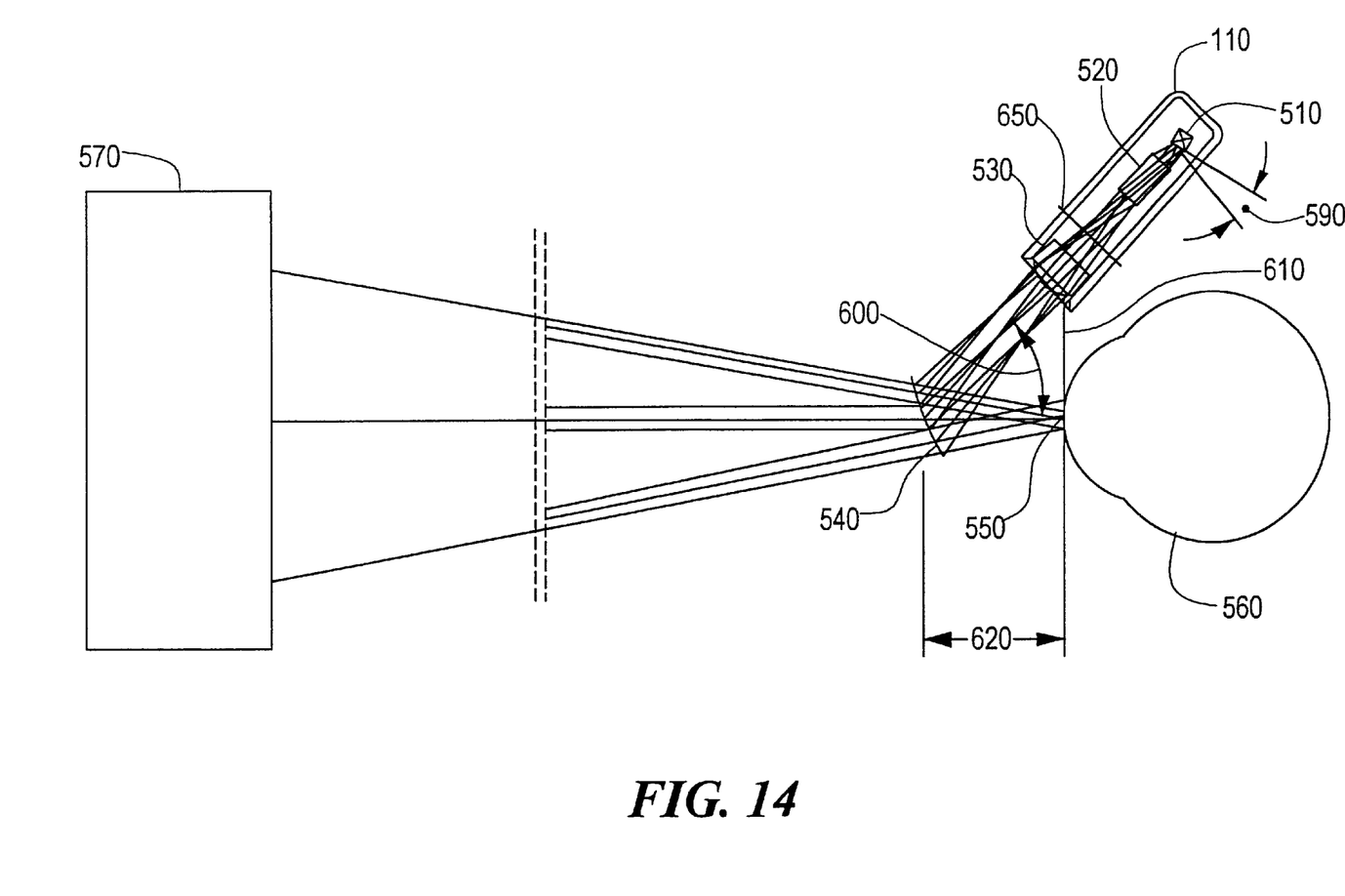
FIG. 14 is a ray trace of the embodiment of the invention shown in FIG. 12.

FIG. 14 represents an optical ray trace of the third preferred embodiment shown in FIG. 13. In the optical prescription shown, the mirror 215 is a conventional mirror; however, a Mangin mirror may also be used to improve system performance. This embodiment is also represented in the form of an optical prescription in the following table:

| Type | Comment | Radius (mm) | Thickness (mm) | Glass (Note 2) | Diameter (mm) | Conic |
|---|---|---|---|---|---|---|
| Plane Surface | Image, Image Distance | Infinity | 609.000 | | 276.827 | No |
| Plane Surface | Eye Relief, Distance to Eye Pupil | Infinity | 20.000 | | 11.562 | No |

-continued

| Type | Comment | Radius (mm) | Thickness (mm) | Glass (Note 2) | Diameter (mm) | Conic |
|---|---|---|---|---|---|---|
| Plane Surface | Eye Pupil, and Return Distance to Mirror | Infinity | −20.000 | | 3.000 | No |
| Plane Surface | Coordinate Break Tilt of 22.5 Deg. | — | 0.000 | | — | No |
| Mirror Tilt | Aspheric Mirror | −32.724 | 0.000 | MIRROR | 11.000 | No |
| Asphere* | Distance to Relay, Second Coordinate Break of 25 Deg. | — | 22.338 | | — | Note 1 |
| Mirror Tilt | Relay Lens | 39.060 | 5.000 | LAKN6 | 10.000 | No |
| Sphere | Distance to Imager | −14.091 | 11.514 | | 10.000 | No |
| Sphere | Imager Lens | 3.264 | 7.000 | SFL6 | 4.000 | No |
| Sphere | Distance to Focal Plane | −3.680 | 0.946 | | 4.000 | No |
| Sphere | Tilt of 7.5 Degrees | — | 0.000 | | — | No |
| Image Plane Tilt | Display | Infinity | | | 3.000 | No |

Note 1. Asphere Definition:

$$z := \frac{cr^2}{1 + \sqrt{1 - (1+k) \cdot c^2 \cdot r^2}} + \alpha_1 \cdot r^2 + \alpha_2 \cdot r^4 + \alpha_3 \cdot r^6 + \alpha_4 \cdot r^8$$

where:
- $z$=Sag depth at radius r;
- $r=(x^2+y^2)^{1/2}$;
- k=Conic Constant=−1(Parabola);
- c=Vertex curvature=1/R; R=−32.724;
- $\alpha_1$=0.026177;
- $\alpha_2$=1.98943×10$^{-5}$;
- $\alpha_3$=9.23124×10$^{-7}$; and
- $\alpha_4$=1.04313×10$^{-8}$.

Note 2. Glass per the catalog of Schott Glass Technologies, Inc., 400 York Avenue, Duryba, Pa. 18642.

In this embodiment (FIG. 14), a miniature optical display 510 provides an illuminated image, which is initially magnified and relayed by the lenses in housing 110 comprising an imaging lens 520, and a relay lens 530. The light is relayed to mirror 540, which in turn relays the image to the system exit pupil 550. The eye 560 of the observer is preferentially located at the exit pupil, and the observer views an image 570 reflected from the mirror at a comfortable viewing distance, for example between 250 mm and infinity. In order to improve the resolution properties of the system, and to better compensate for astigmatism and coma, display 510 is preferentially tilted at an angle 590 up to half of the axis tilt angle 600. Relay lens 530 is located in a line substantially parallel to a line 610 crossing the user's face at the level of the front of the user's eyes. Mirror 540 is preferentially an aspheric surface, with properties as shown in Table 1, and is located at an eye relief distance 620 of 15 to 20 mm, and within the eyeglass lens (not shown). In this embodiment, the image of the display is an inverted and mirror reverted image with less than 3% distortion. This distortion, mirror reversion, and inversion are preferentially compensated via electronic changes in a digital frame buffer prior to display by the imager. Without departure from the scope of this embodiment, these defects may alternatively be compensated optically, with the addition of a fold mirror, preferentially located at 650, and optionally via the use of more complex optics, for example doublets, triplets, off-axis or aspheric elements or additional optics within the optics total track. Further, such optics may be employed, within the context of this preferred embodiment, to modify the spot size to match the optical resolution to a display of a particular size and resolution and an image of desired angular extent, or to obtain a projection system that is more close to axial in design, as shown in FIG. 15.

An optical relay with its associated lenses or holograms 210 and reflectors or holograms 215, either off-axis in nature, as shown, or on-axis, intended to permit magnified viewing of the display, is placed in the space 220 between the external sheets of the main lens. In this embodiment, the off-axis design, due for example to the angle of the larger lens 210 with respect to ray 120, enables the interior elements to be placed at angles that reduce interior undesirable reflection, that help hide the interior surfaces, and that permit the lens thickness to be reduced.

Because the internal volume 220 between the surfaces is not solid, either refractive or reflective elements may be easily used. However, antireflection coatings are needed to minimize reflections from the surfaces of the elements 210, 215. Alternatively, the interior volume may be filled with a gas, liquid or solid, although the filling with materials having an index of refraction greater than 1.0 adds optical power to the eyeglass lens if the surfaces are not nearly identical curves, and reduces the optical power of internal refractive surfaces. The added eyeglass optical power can be used if desired to correct the user's vision.

Figure 15:
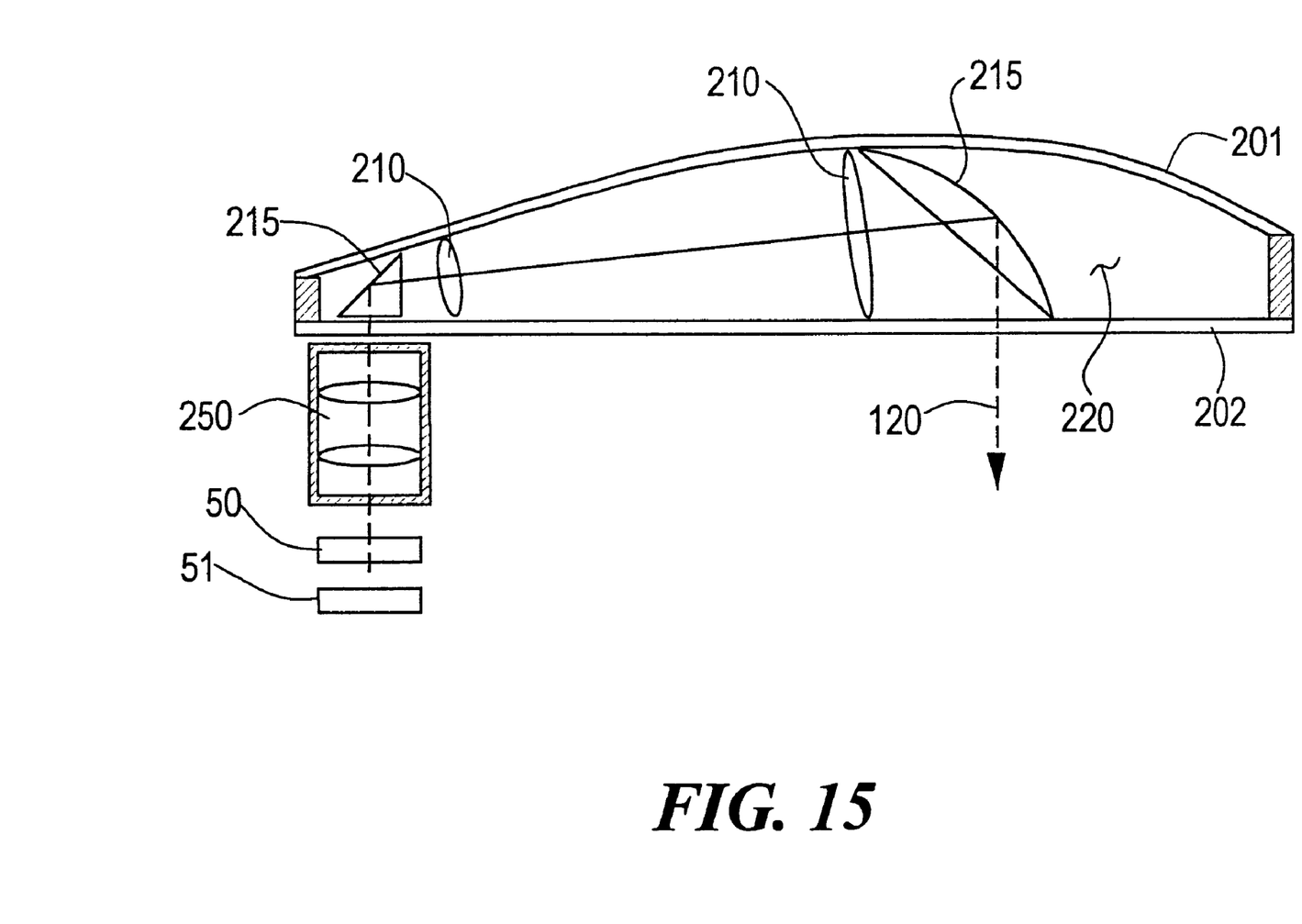
FIG. 15 is a schematic illustration of a still further embodiment of an eyeglass lens according to the present invention.

The lens shown in FIG. 15 may be used in eyewear, may be made with curvature on both surfaces, and may be designed for correction of the user's vision by adding the correct curvature to the inside or outside surfaces, or by filling as discussed above.

Off-axis systems require aberration correction. Spitzer has described aberration control in a scanned system by adjusting the method of scanning. Alternatively, for systems using flat panel displays, Alvelda has proposed distorting the pixel field to "pre-correct" pin cushion, barrel and tombstone aberration. (P. Alvelda, "MicroDisplay Technology," SPIE vol. 3058, p. 183, 1997.) Rallison (U.S. Pat. No. 5,303,085) hag described using a shaped fiber optic faceplate. A further method of correcting the total system aberrations comprises the use of optical elements 520, 530 (FIG. 5) that have been designed by using ray tracing computer programs to minimize the total aberration, as previously described. These elements, which may themselves comprise off-axis elements, when used in conjunction with the off-axis magnifier within the lens, can provide a reduction in coma and other off-axis distortions. To this end, H. Hoshi, N. Taniguchi, H. Morishima, T. Akiyama, S. Yamazaki, and A. Okuyama have described methods of forming an aspherical wavefront that is precorrected for off-axis aberrations by employing asymmetric aspherical optical elements ("Off-axial HMD optical system consisting of aspherical surfaces without rotational symmetry," SPIE vol. 2653, p. 234, 1996.)

An alternative method of pre-correcting the image is to apply a distortion correction algorithm to the image while in electronic form, and to store the pre-corrected image in video memory, and then to display the pre-corrected image on the flat panel or scanned display. The pre-corrected image is aberrated; however, when viewed through the off-axis optical system, the pre-correction cancels the off-axis aberration thus providing a good image to the view.

A further method of correcting the total system aberrations comprises the use of optical elements 250 that have been designed by using ray tracing computer programs to minimize the total aberration. These elements, which may themselves comprise off-axis elements, when used in conjunction with the off-axis magnifier within the lens, can provide a reduction in coma and other off-axis distortions.

The location and specification of the lenses in the figures can be altered as desired for a specific optical design. The invention is not to be limited by what has been particularly shown and described, except as indicated by the appended claims.

What is claimed is:

1. An optical display system comprising;
  an eyeglass lens assembly comprising:
    a first lens section having a first surface, at least a portion of the first surface having a first curvature,
    a second lens section having a second surface, at least a portion of the second surface having a second curvature, and
    an interface between the first surface and the second surface, the interface comprising an optical layer and conforming to the first curvature of the first surface and the second curvature of the second surface; and
    an image source located off-axis with respect to the interface to transmit light along an optical path that is directed by the optical layer of the interface toward an eye of a user.

2. The optical display system of claim 1, wherein the optical path includes a first section through air, and at least a further section within the first lens, the path further including refraction at an interface between air and the first lens.

3. The optical display system of claim 2, wherein the optical path further includes a second section through air to the eye, the path further including refraction at an interface between air and the first lens.

4. The optical display system of claim 1, wherein the first curvature is convex and the second curvature is concave.

5. The optical display system of claim 1, wherein the first curvature and the second curvature conform.

6. The optical display system of claim 1, wherein the first curvature is spherical, toric, parabolic, aspherical, or flat.

7. The optical display system of claim 1, wherein the second curvature is spherical, toric, parabolic, aspherical, or flat.

8. The optical display system of claim 1, wherein the first curvature and the second curvature are selected to provide a desired degree of magnification.

9. The optical display system of claim 1, wherein the optical layer at the interface comprises a multi-layer thin film coating.

10. The optical display system of claim 1, wherein the optical layer at the interface reflects a preselected wavelength band.

11. The optical display system of claim 1, wherein the optical layer at the interface reflects a preselected linear polarization and transmits a corresponding orthogonal linear polarization.

12. The optical display system of claim 1, wherein the interface comprises a thin metal coating.

13. The optical display system of claim 12, wherein the thin metal coating comprises aluminum, chromium, or silver.

14. The optical display system of claim 1, wherein the optical layer at the interface reflects a portion of incident light and transmits a further portion of the incident light.

15. The optical display system of claim 1, wherein the interface comprises a diffractive layer.

16. The optical display system of claim 1, wherein the interface comprises a holographic layer.

17. The optical display system of claim 1, wherein the interface comprises a multi-layer thin-film coating and a further layer comprising a diffractive layer or a holographic layer.

18. The optical display system of claim 1, further comprising an eyeglass frame, and the eyeglass lens assembly and the image source are supported by the eyeglass frame.

19. The optical display system of claim 18, wherein the image source is housed in a display housing and the display housing is adjustably mounted to the eyeglass frame.

20. The optical display system of claim 1, further comprising a head-mountable frame, and the eyeglass lens assembly and the image source are supported by the head-mountable frame.

21. The optical display system of claim 1, wherein the image source comprises an active matrix liquid crystal display, a flat panel active matrix electroluminescent display, a flat panel field emission display, a cathode ray tube, or an array of light emitting diodes.

22. The optical display system of claim 1, further comprising an element operative to provide aberration correction.

23. The optical display system of claim 22, wherein the element comprises an optical element.

24. The optical display system of claim 22, wherein the element provides correction to the image electronically.

25. The optical display system of claim 22, wherein the image source is a scanned display and the element is operative to adjust the scanning.

26. The optical display of claim 22, wherein the element is operative to provide distortion to a pixel field.

27. The optical display system of claim 1, wherein the optical element is located to transmit light to the lens assembly along the optical path disposed at an angle to an optical axis of the interface.

28. An optical display system comprising:
    an eyeglass lens assembly comprising:
        a first surface;
        a second surface;
        a space between the first surface and the second surface;
        an optical relay assembly comprising a lens system disposed to direct light into the space between the first surface and the second surface, the optical relay assembly further comprising at least a first optical element to transmit light on an optical path in the space between the first surface and the second surface, and at least a further optical element to direct light on the optical path out through the first surface or the second surface toward a user's eye, the optical path disposed off-axis with respect to the lens system of the optical relay assembly.

29. The optical display system of claim 28, wherein the first surface is formed by one side of a first thin sheet and the second surface is formed by one side of a second thin sheet.

30. The optical display system of claim 28, wherein the first and second thin sheets are formed of glass or plastic.

31. The optical display system of claim 28, wherein the first surface and the second surface have different curvatures.

32. The optical display system of claim 28, wherein the first optical element comprises a lens or a hologram.

33. The optical display system of claim 28, wherein the second optical element comprises a reflector or a hologram.

34. The optical display system of claim 28, further comprising an antireflection coating on at least one of the first optical element and the second optical element.

35. The optical display system of claim 28, further comprising a solid, liquid, or gas material filling the space between the first surface and the second surface.

36. The optical display system of claim 35, wherein the solid, liquid, or gas material has an index of refraction greater than 1.0.

37. The optical display system of claim 28, further comprising an eyeglass frame, and the eyeglass lens assembly is mounted in the eyeglass frame and
    an image source located to transmit light to the optical relay assembly onto the optical path.

38. The optical display system of claim 28, further comprising an element operative to provide aberration correction.

39. The optical display system of claim 38, wherein the element comprises an optical element.

40. The optical display system of claim 38, wherein the element provides correction to the image electronically.

41. The optical display system of claim 38, wherein the image source is a scanned display and the element is operative to adjust the scanning.

42. The optical display of claim 38, wherein the element is operative to provide distortion to a pixel field.

43. An optical display system comprising:
    an eyeglass lens assembly comprising:
        a first surface;
        a second surface;
        a space between the first surface and the second surface;
        an optical relay assembly comprising a lens system disposed to direct light into the space between the first surface and the second surface, the optical relay assembly further comprising at least an optical element disposed in the space between the first surface and the second surface to transmit light on an optical path out through the first surface or the second surface toward a user's eye, the lens system of the optical relay assembly located off-axis with respect to the optical element.

44. The optical display system of claim 43, wherein the first surface is formed by one side of a first thin sheet and the second surface is formed by one side of a second thin sheet.

45. The optical display system of claim 43, wherein the first and second thin sheets are formed of glass or plastic.

46. The optical display system of claim 43, wherein the first surface and the second surface have different curvatures.

47. The optical display system of claim 43, wherein the optical element comprises a mirror.

48. The optical display of claim 43, further comprising a solid, liquid, or gas material filling the space between the first surface and the second surface.

49. The optical display of claim 43, further comprising an element operative to provide aberration correction.

50. The optical system of claim 49, wherein the element comprises an optical element.

51. The optical system of claim 49, wherein the element provides correction electronically.

* * * * *

UNITED STATES PATENT AND TRADEMARK OFFICE
CERTIFICATE OF CORRECTION

PATENT NO. : 6,353,503 B1
DATED : March 5, 2002
INVENTOR(S) : Mark B. Spitzer et al.

It is certified that error appears in the above-identified patent and that said Letters Patent is hereby corrected as shown below:

<u>Title page,</u>
Item [73], Assignee, The Micropitical Corporation," should read -- The MicroOptical Corporation, --;

<u>Column 9,</u>
Line 46, "hag" should read -- has --;

<u>Column 12,</u>
Lines 55 and 58, "display of" should read -- display system of --;
Lines 60 and 62, "optical system" should read -- optical display system --.

Signed and Sealed this

Twenty-second Day of October, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO. : 6,353,503 B1
DATED : March 5, 2002
INVENTOR(S) : Mark B. Spitzer et al.

It is certified that error appears in the above-identified patent and that said Letters Patent is hereby corrected as shown below:

Title page,
Item [73], Assignee, The Micropitical Corporation," should read
-- The MicroOptical Corporation, --;

Column 9,
Line 46, "hag" should read -- has --;

Column 12,
Lines 55 and 58, "display of" should read -- display system of --;
Lines 60 and 62, "optical system" should read -- optical display system --.

Signed and Sealed this

Twenty-ninth Day of October, 2002

Attest:

Attesting Officer

JAMES E. ROGAN
Director of the United States Patent and Trademark Office